(12) United States Patent
Wegelin

(10) Patent No.: US 10,545,044 B2
(45) Date of Patent: *Jan. 28, 2020

(54) METHOD AND DEVICE FOR INDICATING FUTURE NEED FOR PRODUCT REPLACEMENT OF RANDOM-USE DISPENSING

(71) Applicant: GOJO Industries, Inc., Akron, OH (US)

(72) Inventor: Jackson W. Wegelin, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,758

(22) Filed: Jan. 23, 2017

(65) Prior Publication Data
US 2017/0131130 A1    May 11, 2017

Related U.S. Application Data

(63) Continuation of application No. 12/425,444, filed on Apr. 17, 2009, now Pat. No. 9,555,429, which is a
(Continued)

(51) Int. Cl.
*G01F 17/00* (2006.01)
*G01F 13/00* (2006.01)
(Continued)

(52) U.S. Cl.
CPC ............. *G01F 17/00* (2013.01); *B05B 11/30* (2013.01); *B05B 11/308* (2013.01);
(Continued)

(58) Field of Classification Search
USPC .......................................... 705/22
See application file for complete search history.

(56) References Cited

U.S. PATENT DOCUMENTS 4,782,451 A * 11/1988 Mazzarella ......... G01F 23/0069
340/680
5,249,718 A   10/1993 Muderlak
(Continued)

FOREIGN PATENT DOCUMENTS

EP    1407790 A1   4/2004
GB    2392440 A    3/2004
(Continued)

OTHER PUBLICATIONS

Non-Final Office Action cited in U.S. Appl. No. 11/985,205 dated Apr. 10, 2009, 20 pgs.
(Continued)

*Primary Examiner* — Garcia Ade
(74) *Attorney, Agent, or Firm* — Cooper Legal Group, LLC

(57) ABSTRACT

A method and device for indicating whether a dispensable product will require refilling prior to the next scheduled service interval includes tracking the amount of use over a first interval, and calculating a frequency based from the use over the first interval. The quantity remaining is compared with the required amount, which is the product of the number of weeks in the service interval and the calculated frequency. Thus, when the quantity remaining is less that the required amount, a warning will be provided to indicate that the dispensing product should be replaced, as it will be empty before the next service interval.

20 Claims, 8 Drawing Sheets

Related U.S. Application Data continuation-in-part of application No. 11/985,205, filed on Nov. 14, 2007, now abandoned.

(51) Int. Cl.
| | |
|---|---|
| *G01F 15/06* | (2006.01) |
| *B05B 11/00* | (2006.01) |
| *B05B 12/00* | (2018.01) |
| *B05B 12/08* | (2006.01) |
| *G01F 23/00* | (2006.01) |

(52) U.S. Cl.
CPC .......... *B05B 12/004* (2013.01); *B05B 12/008* (2013.01); *B05B 12/082* (2013.01); *G01F 13/00* (2013.01); *G01F 15/068* (2013.01); *B05B 11/3053* (2013.01); *B05B 12/081* (2013.01)

(56) References Cited

U.S. PATENT DOCUMENTS

| | | | |
|---|---|---|---|
| 5,301,873 A | | 4/1994 | Burke et al. |
| 5,884,808 A | * | 3/1999 | Muderlak ............ B65D 83/262 222/1 |
| 5,966,753 A | * | 10/1999 | Gauthier .................. A47K 5/12 4/623 |
| 6,267,297 B1 | | 7/2001 | Contadini et al. |
| 6,404,837 B1 | | 6/2002 | Thompson et al. |
| 6,467,651 B1 | | 10/2002 | Muderlak et al. |
| 6,651,851 B2 | | 11/2003 | Muderlak et al. |
| 6,707,873 B2 | | 3/2004 | Thompson et al. |
| 6,727,818 B1 | | 4/2004 | Wildman et al. |
| 6,929,150 B2 | | 8/2005 | Muderlak et al. |
| 7,015,816 B2 | | 3/2006 | Wildman et al. |
| 7,242,307 B1 | | 7/2007 | LeBlond et al. |
| 7,387,239 B2 | * | 6/2008 | Thomas ............... B67D 1/0884 235/381 |
| 7,408,470 B2 | | 8/2008 | Wildman et al. |
| 7,783,380 B2 | | 8/2010 | York et al. |
| 2001/0032353 A1 | | 10/2001 | Contadini et al. |
| 2002/0130146 A1 | * | 9/2002 | Borut ....................... A61L 9/12 222/645 |
| 2004/0124988 A1 | | 7/2004 | Leonard et al. |
| 2006/0055534 A1 | * | 3/2006 | Fergusson ............ G01D 5/2405 340/562 |
| 2006/0124662 A1 | | 6/2006 | Reynolds et al. |
| 2006/0254233 A1 | * | 11/2006 | Bomleny ............ A01D 41/141 56/10.2 E |
| 2007/0236346 A1 | | 10/2007 | Helal et al. |
| 2008/0185395 A1 | | 8/2008 | Sahud et al. |

FOREIGN PATENT DOCUMENTS

| | | |
|---|---|---|
| WO | 0119720 A1 | 3/2001 |
| WO | 0207161 A1 | 9/2002 |

OTHER PUBLICATIONS

Preliminary Amendment cited in U.S. Appl. No. 12/425,444 dated Jun. 24, 2009, 9 pgs.
Non-Final Office Action cited in U.S. Appl. No. 12/405,444 dated Apr. 8, 2011, 58 pgs.
Reply Non-Final Office Action cited in U.S. Appl. No. 12/405,444 dated Jul. 8, 2011, 14 pgs.
Final Office Action cited in U.S. Appl. No. 12/405,444 dated Oct. 21, 2011, 62 pgs.
Reply Final Office Action cited in U.S. Appl. No. 12/405,444 dated Jan. 23, 2012, 12 pgs.
Non-Final Office Action cited in U.S. Appl. No. 12/405,444 dated Aug. 14, 2014, 82 pgs.
Reply Non-Final Office Action cited in U.S. Appl. No. 12/405,444 dated Feb. 16, 2015, 12 pgs.
Final Office Action cited in U.S. Appl. No. 12/405,444 dated May 6, 2015, 65 pgs.
Reply Final Office Action cited in U.S. Appl. No. 12/405,444 dated Sep. 8, 2015, 12 pgs.
Non-Final Office Action cited in U.S. Appl. No. 12/405,444 dated Jan. 5, 2016, 76 pgs.
Reply Non-Final Office Action cited in U.S. Appl. No. 12/405,444 dated May 5, 2016, 13 pgs.
Notice of Allowance cited in U.S. Appl. No. 12/405,444 dated Sep. 20, 2016, 8 pgs.
EP Office Action cited in EP Application No. 10160053.4 dated Dec. 14, 2016, 4 pgs.
Reply EP Office Action cited in EP Application No. 10160053.4 dated Jun. 22, 2017, 3 pgs.
Australian Office Action cited in Australian Application No. 2013201100 dated Jun. 29, 2015, 3 pgs.
Reply Australian Office Action cited in Australian Application No. 2013201100 dated Apr. 21, 2016, 2 pgs.
Australian Office Action cited in Australian Application No. 2013201100 dated May 20, 2016, 3 pgs.
Australian Examination Report cited in Australian Application No. 2016204444 dated Jun. 9, 2017, 3 pgs.
Canadian Notice of Allowance cited in Canadian Application No. 2,700,026 dated Jan. 6, 2017, 1 pg.

* cited by examiner

METHOD AND DEVICE FOR INDICATING FUTURE NEED FOR PRODUCT REPLACEMENT OF RANDOM-USE DISPENSING

CROSS-REFERENCE TO RELATED APPLICATIONS

This application is a continuation of U.S. patent application Ser. No. 12/425,444 filed on Apr. 17, 2009, which is a continuation-in-part of U.S. patent application Ser. No. 11/985,205 filed on Nov. 14, 2007, the contents of which are incorporated herein by reference.

TECHNICAL FIELD

The invention relates to the field of dispensing indication systems. More particularly, the invention relates to methods and devices for inventory control and efficient route planning for the supply and maintenance of dispensers. More specifically, the invention relates to monitoring devices and methods for indicating whether product in a dispenser will require replacement prior to the next scheduled service.

BACKGROUND

Many businesses employ service providers to supply and maintain dispensing systems, including paper towel, toilet paper, and soap dispensers. The service provider must ensure that the dispenser does not empty prior to the next scheduled maintenance, while avoiding unnecessary replacement of product, which increases cost in both service time and the product itself. Therefore, there is a need to predict the depletion of product several weeks in advance and provide indication of the same to the service provider.

Dispenser indicators for low product are widely known in the art. However, known dispensers provide indication by fixed recordings of information. In other words, a dispenser will incorporate a counter or sensor that triggers a warning based from a constant value. One disadvantage of these prior-art devices is that they may trigger a warning only after complete consumption of the product. Another disadvantage inherent to these prior-art devices is the inability to predict whether the dispenser requires replacement resulting from the dispenser's varying usage.

Improvements have been made in the art to incorporate more parameters in determining when product should be refilled. One example is U.S. Pat. No. 4,830,791 to Muderlak et al., which teaches an odor-control device in the nature of an olfactory unit that can power up with the detection of a user or can be controlled by a fan-timer circuit. The fan-timer circuit allows the operation of dispensing for a predetermined span of time. The dispenser has a timer circuit that produces a pulse every fifteen minutes and a counter that monitors these pulses. Once the pulse reaches a predetermined number, an indicator light flashes to represent that the cartridge may potentially be empty. However, Muderlak et al. does not compensate for the random use that is characteristic of a large portion of product dispensers.

Another example is U.S. Pat. No. 5,772,074 belonging to Dial et al. Dial et al. teaches an approach to calculate the dispensing of a predetermined amount of a material. The '074 patent teaches a method wherein a dispensing score representative of the time of operation of a dispenser multiplied by a factor representative of the frequency or intensity of dispensing is calculated, and the calculated dispensing score is compared with a predetermined total score. The '074 patent discloses an alarm when the dispensing score is greater than the predetermined total score. The '074 patent does not indicate when the dispenser is almost out of fluid but triggers a warning when it is believed that complete consumption has occurred. In addition, the frequency is not determined from random use but is controlled by a preset frequency. Therefore, there is a need to predict and provide warning of the future emptying of a random-use product dispenser.

Thus, because of the time-consuming nature of checking the refill container of each dispenser, it would be beneficial to be able to anticipate with a reasonable level of accuracy when a refill container is likely to need replacement. By accurately anticipating when a refill container needs to be replaced, the individual may reduce the frequency with which he or she checks specific dispensers for depleted or inoperable refill containers. As a result, the individual would be able to allocate the time otherwise spent checking non-depleted or operable refill containers toward checking and replacing additional depleted refill containers.

Therefore, there is a need for a method and device that indicates the future need for replenishing a product, which reduces the frequency with which an individual is required to check to determine if a refill container requires replacement.

SUMMARY OF THE INVENTION

In light of the foregoing, it is a first aspect of the present invention to provide a method and device for indicating future need for product replacement for random-use dispensing;

It is another aspect of the present invention to provide a method and device for indicating future need for product replacement that is adaptable to receive differing amounts of dispensing material;

Yet another aspect of the present invention is to provide a device adaptable to a variety of different product refills that determines the need of product replacement based on product quantity, next scheduled service, and random usage (to prevent complete emptying of product prior to next scheduled service).

A further aspect of the present invention is to provide a device with an adjustable service interval input that determines the need of product replacement based on product quantity, next scheduled service, and random usage (to prevent complete emptying of product).

Yet another aspect of the present invention is to provide a method for indicating when to replace material in a dispenser setting an activation count to a number representative of the amount of dispenses remaining, setting a service interval for the dispenser over a number of units of time, decrementing said activation count upon each activation of the dispenser, calculating a running average of material usage representative of one unit of time, comparing said activation count with the product of said running average and said service interval, and indicating the dispenser requires refilling when said product is greater than said activation count.

A further aspect of the present invention is to provide a dispenser for dispensing product comprising an activation count setting means for setting an activation count; a means for setting a service interval for allowing entry of a service interval representative of the number of units of time before next service; a dispensing mechanism; an indication means; a controller; and a switch associated with said dispensing mechanism that generates a voltage received by said controller that decrements an activation count associated with the number of dispenses of material, wherein said controller compares said activation count with the product of said service interval and average of material usage representative of one unit of time, said controller sending a signal to said indication means when said product is greater than said activation count.

Yet another aspect of the present invention is to provide a dispenser to dispense material from a refill container comprising a controller maintaining an initial quantity value defining the amount of material carried by the refill container; an actuator coupled to said controller; a pump adapted to be operatively coupled to the refill container, said pump also coupled to said controller, wherein when said actuator is engaged, said pump dispenses an amount of said material from the refill container according to a shot size value maintained by said controller, said controller updating a cumulative usage value maintained thereby by said shot size value, and generating a current quantity value based on the difference between said initial quantity value and said cumulative usage value; a timer associated with said controller to update a timed count value, said timer initiated when said refill container is coupled to said pump; and an indicator coupled to said controller, wherein said controller generates an average usage value based on said cumulative usage value and said timed count value, whereupon said controller generates a service interval value based on said current quantity value and said average usage value, said service interval value displayed by said indicator.

A further aspect of the present invention is to provide a dispenser comprising a refill container carrying an initial amount of material; a controller configured to maintain an initial quantity value defined by said initial amount of material maintained by said refill container; an actuator coupled to said controller; a pump coupled to said controller and to said refill container, wherein when said actuator is engaged, said pump dispenses an amount of said material from said refill container according to a shot size value maintained by said controller, said controller updating a cumulative usage value maintained thereby by said shot size value, and generating a current quantity value based on the difference between said initial quantity value and said cumulative usage value; a timer coupled to said controller to update a timed count value, said timer initiated when said refill container is coupled to said pump; and an indicator coupled to said controller, wherein said controller generates an average usage value based on said cumulative usage value and said timed count value, whereupon said controller generates a service interval value based on said current quantity value and said average usage value, said service interval value displayed by said indicator.

Yet another aspect of the present invention is to provide a method of determining the remaining service interval of a refill container comprising providing a dispenser to dispense material from a refill container, said refill container having an initial amount of said material; providing an indicator maintained by said dispenser; dispensing material from said refill container in a predetermined shot size; monitoring the total dispensement of said material from said initial amount; generating an average usage value based on the total dispensement of said material over a period of time; generating a service interval value indicating the remaining durational operating life of said refill container based on the remaining quantity of said material and said average usage value; and indicating said service interval value via said indicator.

A further aspect of the present invention is to provide a dispenser to dispense material from a refill container comprising a controller maintaining an initial quantity value defining the amount of material carried by the refill container, said controller including a timer that maintains a timed count value that is updated at a predetermined interval; an indicator coupled to said controller; an actuator coupled to said controller; a pump coupled to said controller and adapted to be operatively coupled to the refill container, said controller initiating said timer when the refill container is coupled to said pump, such that when said actuator is engaged, said pump dispenses an amount of material from the refill container according to a predetermined shot size value and said controller updates a cumulative usage value maintained thereby by said shot size value; wherein said controller calculates an average usage value from the division of said cumulative usage value and said timed count value, said controller calculating a service interval from the division of said average usage value and said timed count value that is communicated via said indicator.

Yet another aspect of the present invention is to provide a dispenser comprising a refill container carrying an initial amount of material; a controller configured to maintain an initial quantity value defined by said initial amount of material maintained by the refill container, said controller including a timer that maintains a timed count value that is updated at a predetermined interval; an indicator coupled to said controller; an actuator coupled to said controller; a pump coupled to said controller and adapted to be operatively coupled to the refill container, said controller initiating said timer when the refill container is coupled to said pump, such that when said actuator is engaged, said pump dispenses an amount of material from the refill container according to a predetermined shot size value and said controller updates a cumulative usage value maintained thereby by said shot size value, wherein said controller calculates an average usage value from the division of said cumulative usage value and said timed count value, said controller calculating a service interval from the division of said initial quantity value by said average usage value that is communicated via said indicator.

A further aspect of the present invention is to provide a method of determining the remaining service interval of a refill container comprising providing a dispenser to dispense material from a refill container, said refill container having an initial amount of said material; providing an indicator maintained by said dispenser; dispensing material from said refill container; monitoring the total dispensement of said material; generating an average usage value based on the total dispensement of said material over a period of time; generating a service interval value indicating the remaining durational operating life of said refill container based on the initial quantity of said material divided by said average usage value; and indicating said service interval value via said indicator.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
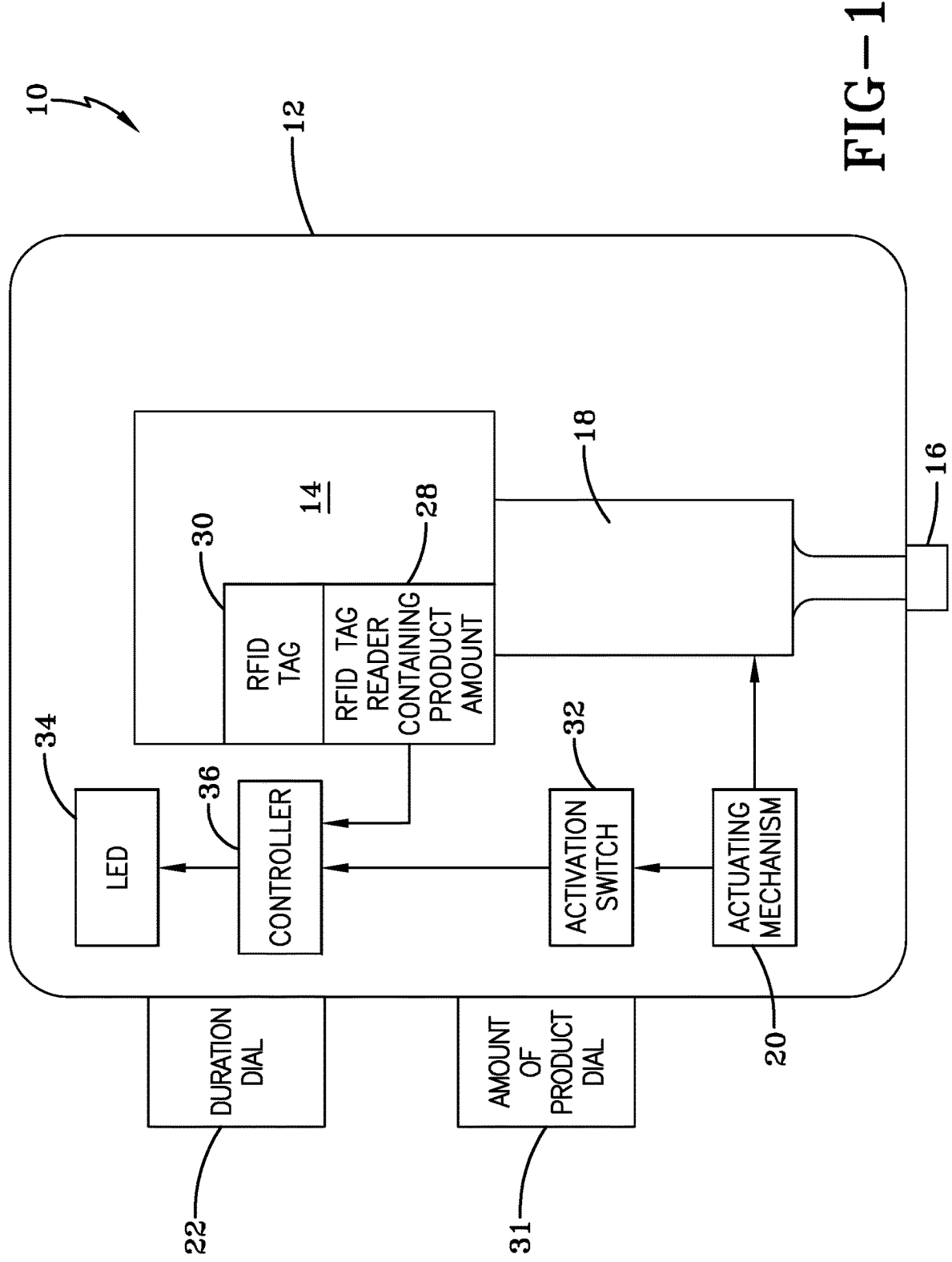
FIG. 1 is a schematic of a dispenser in accordance with the concepts of the present invention.

Referring now to the drawings and more particularly to FIG. 1, it can be seen that a dispenser made in accordance with the invention is designated generally by the numeral 10. The dispenser includes a dispenser housing structure of widely-known dispensers, designated generally by the numeral 12. The dispenser housing 12 may be a wall or counter-mount unit or can be a freestanding unit disposed on a countertop or the like. The dispenser described herein is used for dispensing fluids, such as soaps and other liquids, but it will be appreciated that other products could be dispensed, such as paper, tablets, or any flowable material. In any event, the dispenser housing 12 typically includes a cartridge of liquid product 14 positioned above and in communication with a dispensing nozzle 16, with an appropriate pump or other dispensing mechanism 18 interposed therebetween. As is well known by those skilled in the art, the dispensing mechanism 18 is configured to dispense a preset amount of liquid upon each dispensing cycle. In accordance with the invention, the dispensing mechanism 18 is controlled by an actuating mechanism 20, such as a motor, solenoid, plunger or the like. The mechanism 20 is energized upon the detection of an object, such as a user's hands, positioned beneath the dispensing nozzle 16. However, the mechanism 20 is not limited to a touch-free device and can employ any means of actuation readily known in the art.

Figure 2:
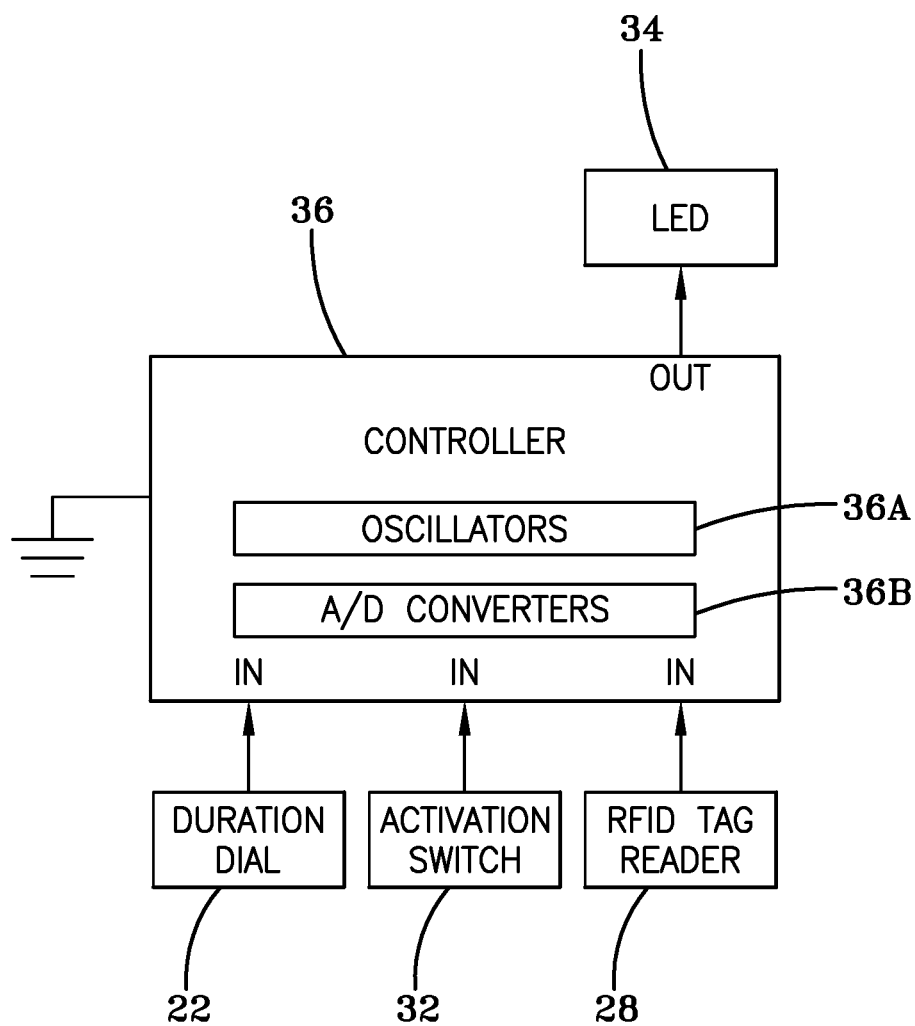
FIG. 2 is a detailed schematic of the dispenser showing a controller, an RFID tag reader, a potentiometer, and an LED according to the present invention.

Referring now to FIG. 2, it can be seen that an indication circuit, designated generally by the numeral 21, includes a duration dial 22, which allows an end user to select a service interval representative of the total amount of time before the next scheduled service. The duration dial 22 consists of a potentiometer 24 and knob 26 representative of the amount of time associated with potentiometer 24. In the preferred embodiment, the service interval is based on a selected number of weeks; however it should be readily apparent that the service interval may represent any time interval. In another embodiment, the service interval may be preprogrammed to an arbitrary value, such as four weeks.

The indication circuit 21 also includes a radio frequency identification ("RFID") tag reader 28 that communicates with an RFID tag 30 included on the refill cartridge 14. The RFID tag 30 includes an activation count, which will be further described below. In the alternative, the activation count can be established by a variety of methods, including bar code technology, a resistor representative of the count positioned on the refill cartridge, or by an amount of product dial (potentiometer 31) that allows for manual entry by a service provider. Similar to the service-interval control, the activation count may also be preprogrammed to an arbitrary value representative to the size of the refill.

The indication circuit 21 includes an activation switch 32 associated with actuating mechanism 20. The indication circuit 21 provides an indication in the form of a light-emitting diode (LED) 34 that flashes (illuminates) when the cartridge of the dispenser is in need of replacement prior to the next service interval. The indication is generated prior to complete depletion of the product and only when usage suggests the product will need to be refilled prior to the next service interval. The LED 34 can be replaced with any warning, such as a buzzer, bulb, or any other device that would provide apparent indication to the service provider that the dispenser is in need of a replacement refill. It should also be noted that the LED 34 does not have to be positioned on dispenser 10 and can be located remotely.

The indication circuit 21 also includes a controller 36, which receives data from duration dial 22, the RFID tag reader 28, and the activation switch 32. Controller 36 provides the necessary hardware, software, and memory to implement the functions of the control circuit and properly operate the dispenser 10. In the preferred embodiment, the controller 36 can read up to six different voltage settings provided by the potentiometer 24 for the service interval and can adjust the initial activation count provided by the RFID tag reader 28. The controller 36 processes the information provided from the above-stated inputs and determines whether to supply voltage to the LED 34. In the preferred embodiment, the controller 36 will produce a signal to blink the LED 34 once every two seconds.

As shown in FIG. 2, the controller 36 could be a microcontroller such as that manufactured by Zilog. Of course, controllers manufactured by others could be used. The controller 36 may also include, among other components, multiple oscillators 36A and an analog to digital converter 36B. Generally, one of the multiple oscillators 36A could be an internal oscillator, which, if properly enabled, may run continuously. Other oscillators may be used for other functions. Skilled artisans will appreciate that the controller 36 will operate in low-power modes when waiting for the activation switch to be activated and when not performing calculations. Skilled artisans will also appreciate that accurate timekeeping can be maintained by using an accurate watch crystal or by calibrating the controller's internal oscillator(s) 36A to an external watch crystal. According to one embodiment, the converter 36B is utilized by the controller 36 to receive analog voltage signals generated by the duration dial 22. The converter 36B may be in the form of a comparator or an analog-to-digital converter. The controller 36 stores weekly usage and activation count to a non-volatile storage once per day to prevent loss of data during battery replacement. Contemporaneously, the controller 36 averages the daily counts into the weekly average. After servicing the dispenser, the activation count may be reset to an initial value through a number of ways, including a manual reset switch, a unique serial number on the RFID tag, or the like.

Figure 3:
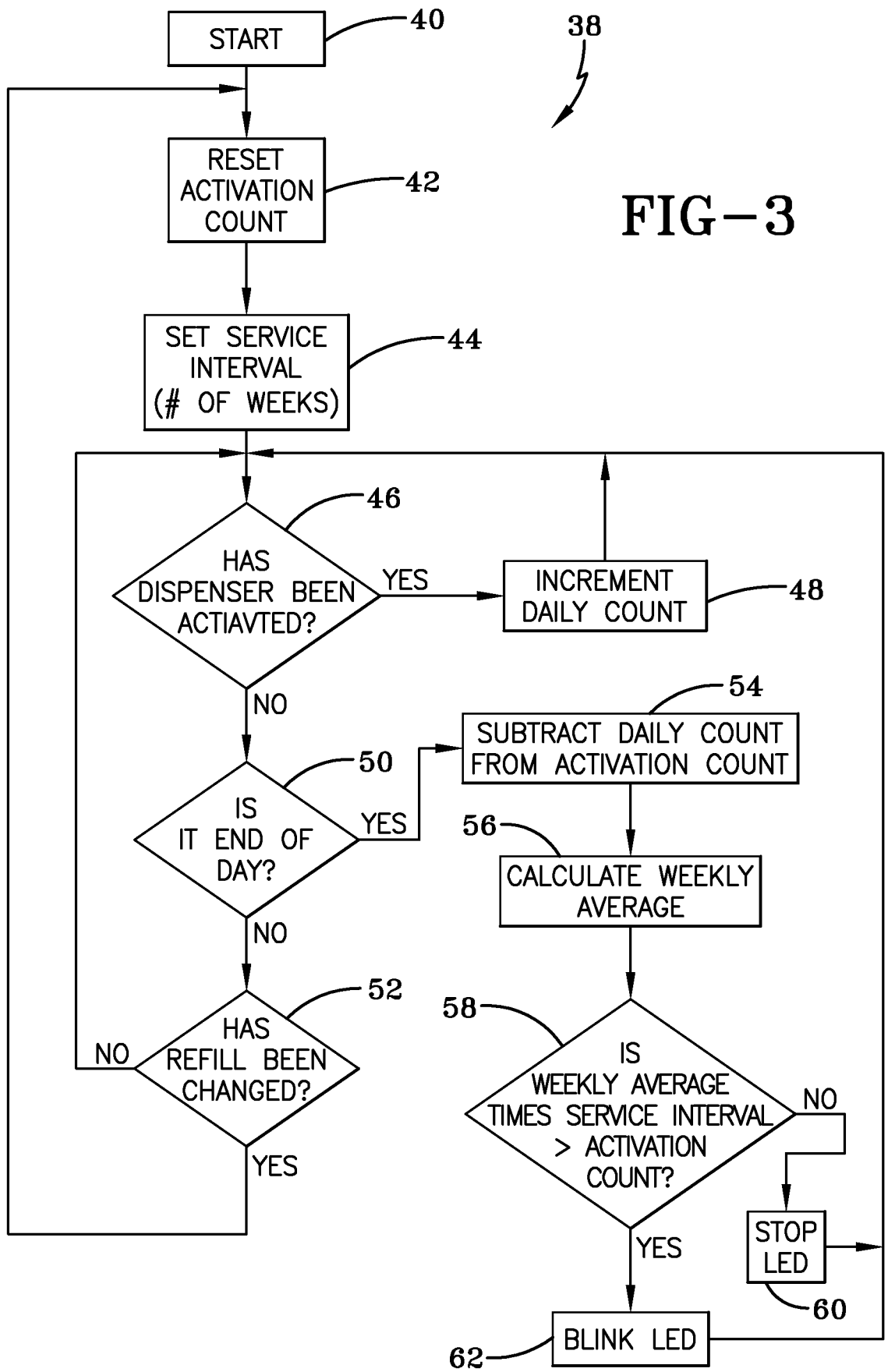
FIG. 3 is a flowchart of the operational steps for triggering the indicator of the present invention.

The operational process performed by the controller 36 for indication is designated by the numeral 38, as shown in FIG. 3. The process 38 has a start sequence at step 40. At step 42, the controller 36 stores an activation count, which is provided by the RFID tag reader 28. The activation count represents the total number of dispenses remaining in the cartridge 14. At step 44, controller 36 stores the service interval in weeks, which is entered from the duration dial. At step 46, controller 36 monitors the activation switch 32 to determine whether the dispenser has been activated. When the controller 36 detects the dispenser has been activated, the controller 36 increments the daily count as shown in step 48 and then returns back to step 46. It should be noted that the daily count is initially set to zero but remains in memory for a weekly average calculation, which will be further discussed below.

If the controller 36 does not receive a signal from the activation switch 32, the controller 36 proceeds to step 50 to determine whether it is the end of the day. When the controller 36 does not detect the end of the day, the controller 36 determines whether the refill has been changed at step 52. At step 52, the controller 36 either returns to step 42 when the controller 36 detects a signal indicating product replacement or returns to step 46 if replacement has not yet occurred.

If the controller 36 receives a signal indicating the end of the day at step 50, the controller 36 proceeds to step 54 and subtracts a daily count from the activation count. At step 56, the controller 36 calculates a weekly average by evaluating the current daily count with the daily counts of the past six days. The weekly average can be calculated even after cartridge replacement because, as stated above, the daily count remains in memory after the service interval and the activation count have been reset. At step 58, the controller 36 compares the product of the weekly average and service interval to the activation count. If the product of the weekly average and service interval is less than the activation count, the controller 36 does not power light-emitting diode 34, as shown in step 60. However, when product of the weekly average and service interval is greater than the activation count, the controller 36 sends a signal to flash the LED 34 to indicate that the dispensing material will be consumed prior to the next scheduled service, as shown at step 62. After step 62, the controller 36 then returns to step 46.

Figure 4:
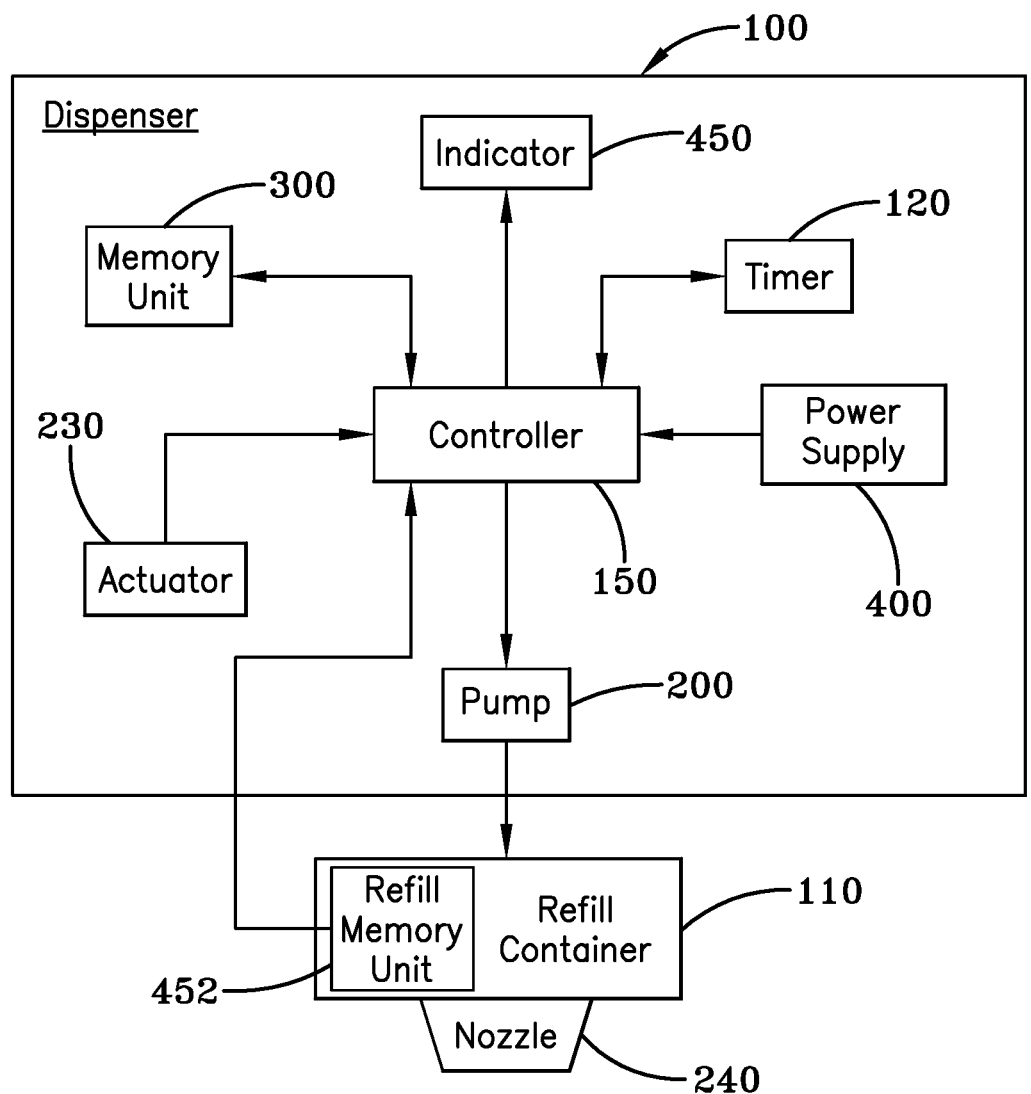
FIG. 4 is a block diagram showing a dispenser with an integrated service interval indicator in accordance with the concepts of the present invention.
Figure 5:
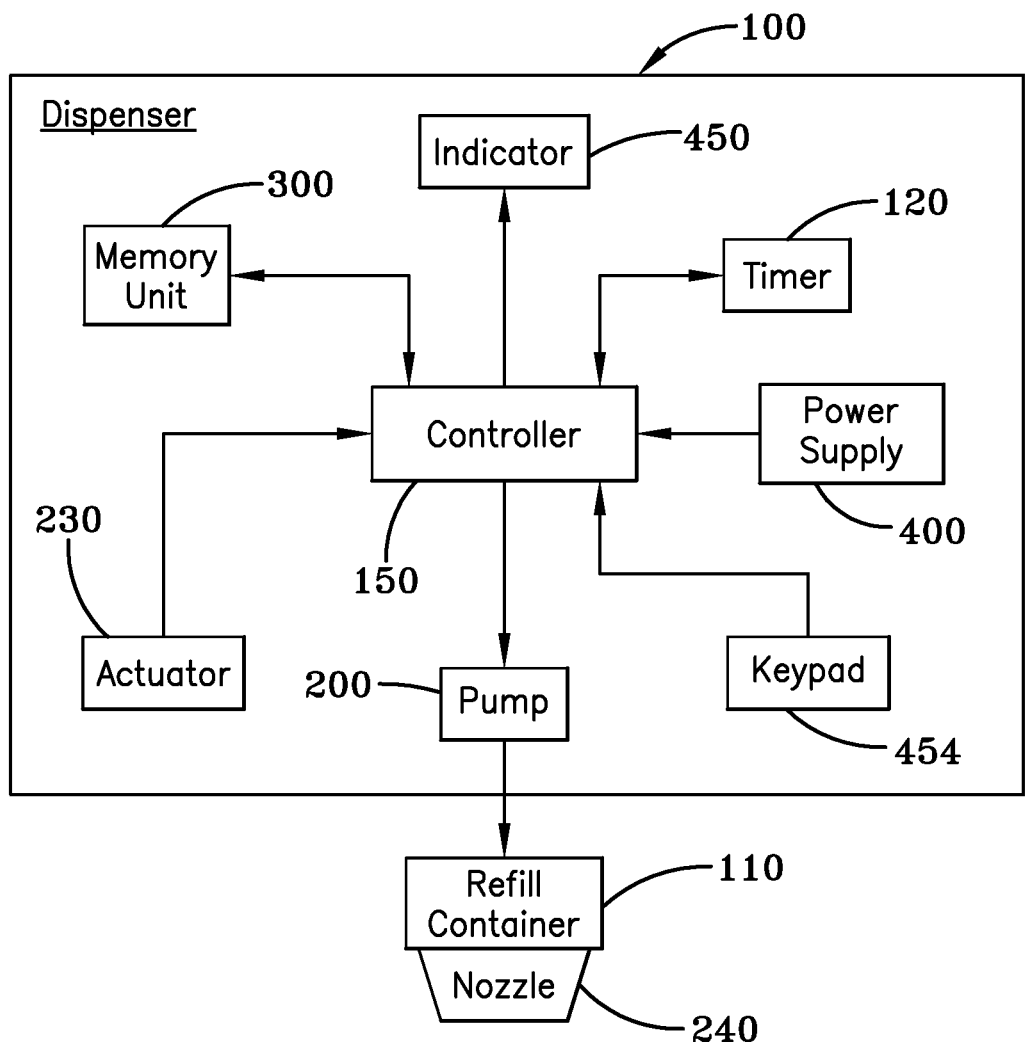
FIG. 5 is a block diagram showing another embodiment of the dispenser that provides a keypad to enter the capacity of a new refill container in accordance with the concepts of the present invention.

Referring now to FIGS. 4-8, another embodiment of the present invention provides a dispenser 100 with an integrated service interval indicator. The dispenser 100, as shown in FIGS. 4 and 5, is configured to maintain a replaceable refill container 110 that carries a predetermined quantity of material, such as soap. During operation of the dispenser 100, a timer 120 that is monitored by a controller 150 identifies the cumulative duration in which the refill container 110 has been placed into use. Using the cumulative duration value, the controller 150 identifies the average usage of the refill container 110 to compute a remaining service interval value or optimum service interval value that identifies the remaining duration in which the refill container 110 is anticipated to remain operable. As such, the dispenser 100 enables the individual charged with the replacement of the consumed or depleted refill containers to reduce the frequency by which they are monitored between their replacement, thereby saving time and resources. For example, the time saved from the reduced monitoring frequency may be used to check and monitor additional dispensers that could not normally be checked by that person.

Specifically, the dispenser 100 includes the controller 150 that comprises the necessary hardware and/or software needed to carry out the functions to be discussed. Coupled to the controller 150 is a pump 200 that is in operative communication with the replaceable refill container 110, which maintains a predetermined amount of material, such as soap. An actuator 230 coupled to the controller 150 initiates a dispensing cycle of a predetermined or metered amount of material from a nozzle 240 in accordance with a shot size value stored at a memory unit 300. The actuator 230 may comprise a manually-actuated button, lever, or other device that when physically engaged, initiates the dispensement of material. Alternatively, the dispenser 100 may be configured to enable touch-free operation, such that the actuator 230 is configured as a proximity sensor, such as an IR (infrared) sensor, whereby the presence of the user's hand initiates the dispensing of material from the refill container 110. Furthermore, while the following discussion is directed to refill containers that maintain material such as soap, the refill container 110 may maintain any other suitable type of material, including but not limited to soap, sanitizer, lotion, or any other viscous, flowable, powder, granular substance or product. It also is foreseen that the dispensers 100 may be readily configured to dispense wipes, tablets, or other products.

The memory unit 300 is coupled to the controller 150 and comprises non-volatile memory (NVM), volatile memory, or a combination of both. In one aspect, the memory unit 300 may be removable from the dispenser 100 so that it can be remotely programmed with various data to be discussed and then reinserted at the dispenser 100. In addition, while the memory unit 300 may be removed from the controller 150, it may be made integral therewith as well. Furthermore, it is also contemplated that the memory unit 300 may be configured to maintain a memory that is integral with the dispenser 100 or that is removable from the dispenser 100.

Also coupled to the controller 150 is the timer 120, which is capable of identifying the amount of time that has elapsed since the refill container 220 was inserted into the dispenser 100. As such, when the dispenser 100 is operational, the timer 120 generates a timed count value that is stored and updated at the memory unit 300. While the timer 120 is shown as being a separate component, it may be integral with the controller 150. In order to provide power in a format compatible with the operation of the dispenser, a power supply 400 is coupled to the controller 150. The power supply 400 may be configured to receive power from either a portable power source, such as a battery, or a mains power source, such as 120 VAC provided by a wall outlet. To display the service interval value computed by the dispenser 100, which represents the remaining operating life of the refill container 110, a visual and/or audible indicator 450 is coupled to the controller 150. The indicator 450 comprises any suitable display or display element, such as an LED (light-emitting diode), LCD (liquid crystal display), speaker, or any other device that may provide visual indicia and/or audible prompts to indicate the remaining service interval for the refill container 220. As a non-limiting example, if the dispenser 100 has approximately two weeks remaining before depletion of the refill, a LED maintained by the dispenser 100 may generate two flashes to indicate that two weeks of product remains.

To enable the generation of either of the remaining or optimum service interval value, which will be discussed below, the controller 150 is required to ascertain an initial quantity value from the refill container 110, which identifies the total amount of material in the refill container prior to its installation at the dispenser 100. As shown in FIG. 1, the initial quantity value may be stored in a refill memory unit 452 maintained by the refill container 110 that is communicated to the controller 150 by an appropriate "reader" when the refill container 110 is installed at the dispenser 100. Alternatively, the memory unit 300 of the dispenser 100 may also be pre-programmed with the initial quantity value at the time of manufacture, prior to the use of the refill container 110. Specifically, the refill memory unit 452 may comprise volatile memory, non-volatile memory, or a combination of both.

In another aspect, as shown in FIG. 5, the dispenser 100 may include a keypad 454 coupled to the controller 150 that enables an individual maintaining the dispenser 100 to manually input the initial quantity value that indicates the capacity of material maintained by the refill container 220. For example, the keypad 454 may comprise suitable numeric buttons or may include predetermined quantities associated with each size of refill container 110. However, it should be appreciated that the keypad 454 may also include other key configurations as well. Once the initial quantity value is input to the dispenser 100, the value is stored at the memory unit 300 where it can be accessed by the controller 150 during the computation of the service interval value.

During the operation of the dispenser 100, the controller 150 computes either of the remaining or the optimum service interval value which identifies the remaining operating life of the refill container 110 by processing a plurality of values that are maintained at either of the memory unit 300 and/or the controller 150, which include: the initial quantity value, the timed count value, a cumulative usage value, a current quantity value, and an average usage value. Specifically, the initial quantity value identifies the amount of material maintained by the refill container 110 prior to its installation into the dispenser 100; the timed count value identifies the amount of time that has elapsed since the refill container 110 was installed and placed into service at the dispenser 100; the cumulative usage value is ascertained by monitoring the number of dispensing events initiated by the actuator 230 and multiplying it by the shot size associated with each dispensing event; the current quantity value identifies the amount of material that remains in the refill container when the service interval value is updated and displayed via the indicator 450; and the average usage value is derived from the division of the cumulative usage value by the timed count value, whereby the average usage value is presented in terms of material quantity per time unit. Thus, such values are maintained and/or processed by the controller 150 and/or memory unit 300, in the manner to be discussed, in order to compute either of the remaining or optimum service interval value for display via the indicator 450.

Figure 6:
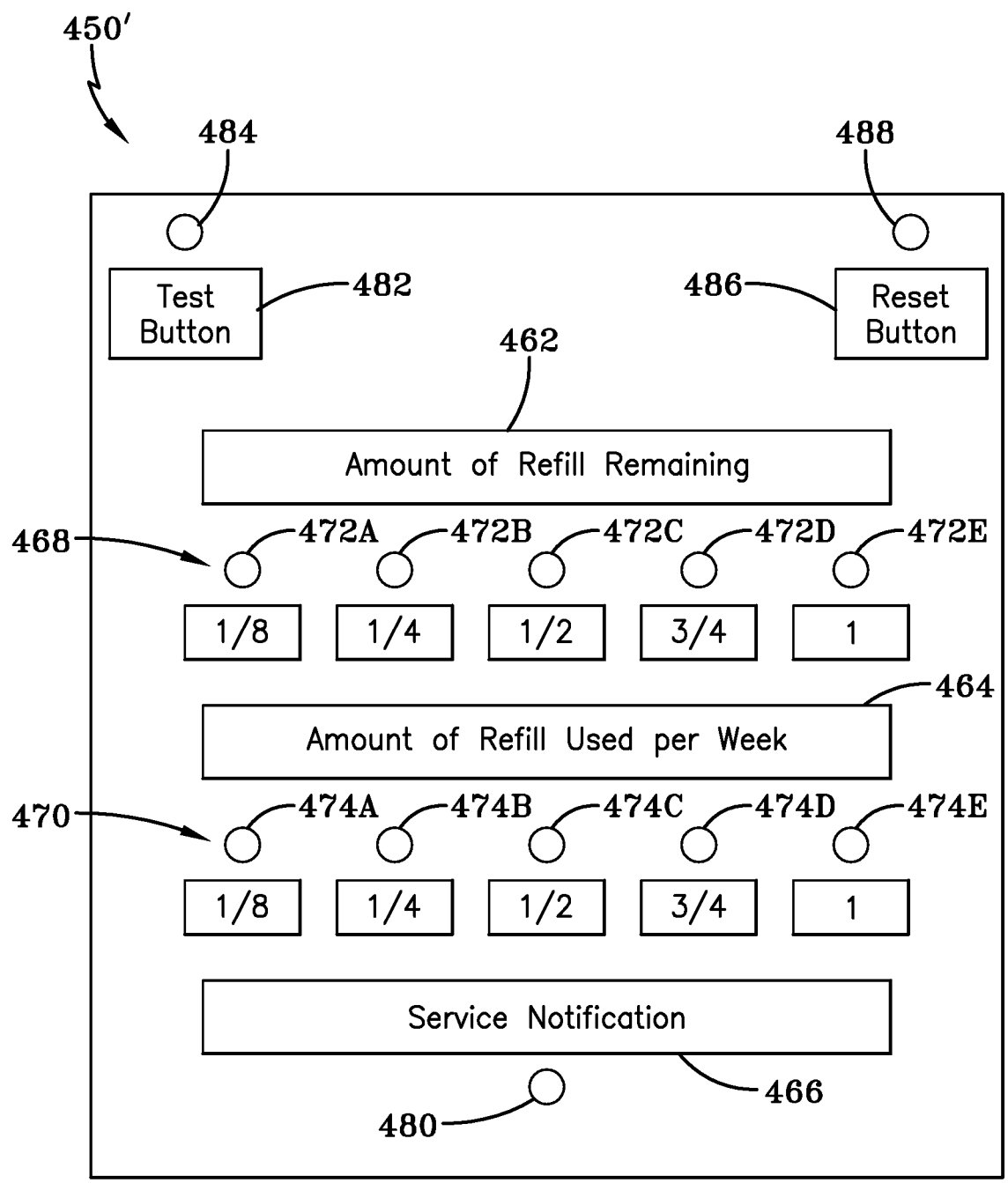
FIG. 6 is a schematic view showing an indicator used to display a service interval in accordance with the concepts of the present invention.

In another aspect of the dispenser 100, an indicator 450', as shown in FIG. 6, allows the user, such as a service technician, to visually identify the amount of material remaining in the refill container 110; the usage rate of the material dispensed from the refill container 110; and when the dispenser 100 requires service. Specifically, the indicator 450' includes a plurality of sections, including an amount of refill remaining section 462, an amount of refill used per week section 464, and a service notification section 466. To visually prompt the user as to the status of sections 462,464, respective indicator groups 468 and 470 are associated therewith. The indicator groups 468 and 470 maintain respective illuminable identifiers 472A-E and 474A-E that are illuminated based on the use of the refill container 110. That is, identifiers 472A, 472B, 472C, 472D, and 472E, which are associated with respective values ⅛, ¼, ½, ¾, and 1, are illuminated to indicate the remaining amounts of material within the refill container 110.

Additionally, identifiers 474A, 474B, 474C, 474D, and 474E, which are associated with respective usage values ⅛, ¼, ½, ¾, and 1, are illuminated in a manner that corresponds to the amount of material that is consumed by the dispenser 100 over a given period of time. That is, the indicator 450', via identifiers 474A-E, is configured to display the service interval associated with consumption of material from the refill container 110 over a given period of time, in a manner to be discussed. For example, the indicator 450' may illuminate identifier 474E, associated with the value "1," to indicate a service interval when an entire refill container 110 of material is consumed over a given period of time, or may illuminate identifiers 474D, 474C, 474B, or 474A to indicate a service interval when ¾, ½, ¼, or ⅛ of the material in the refill container 110 is used over a given period of time, such as a week for example. It should be appreciated that when a computed service interval value is not exactly equal to the usage values associated with the identifiers 474A-E, the identifier associated with a usage value 474A-E that is closest in magnitude to the computed service interval value is illuminated. In addition, the service notification section 466 may also maintain an illuminable identifier 480 that is illuminated when the amount of material remaining in the refill container 110 has been depleted below a predetermined level, to indicate it is in need of replacement. For example, the identifier 480 may illuminate when less than ⅛ of the material in the refill container 110 remains.

The indicator 450' may also include a test button 482 that will illuminate the illuminable identifiers 472A-E and 474A-E for a predetermined period of time, such as one minute, when it is depressed. As such, the illuminable identifiers 472A-E and 474A-E may be configured to only be illuminated, when a test mode is entered upon the depression of a test button 482, although other embodiments exist where the illuminable identifiers 472A-E and 474A-E are illuminated at all times. It should be appreciated that the test button 482 may include an associated illuminable identifier 484 that is illuminated when the test mode is entered after the test button 482 has been depressed. The indicator 450' may also include a reset button 486 that is used when a new refill container 110 has been installed at the dispenser 100. Thus, when the reset button 486 has been depressed, the indicator groups 466 and 468 are set to their default position, whereby identifier 472E associated with the value "1" is illuminated to indicate the refill container 110 is full, while identifiers 474A-E are turned off. Furthermore, the depression of the reset button 486 also results in the resetting of the illuminable identifier 480 if it was previously illuminated to indicate that the previous refill container 110 was empty. In addition, the reset button 486 may also have an illuminable identifier 488 associated therewith that is illuminated to indicate that the reset button 486 has been depressed.

Figure 7:
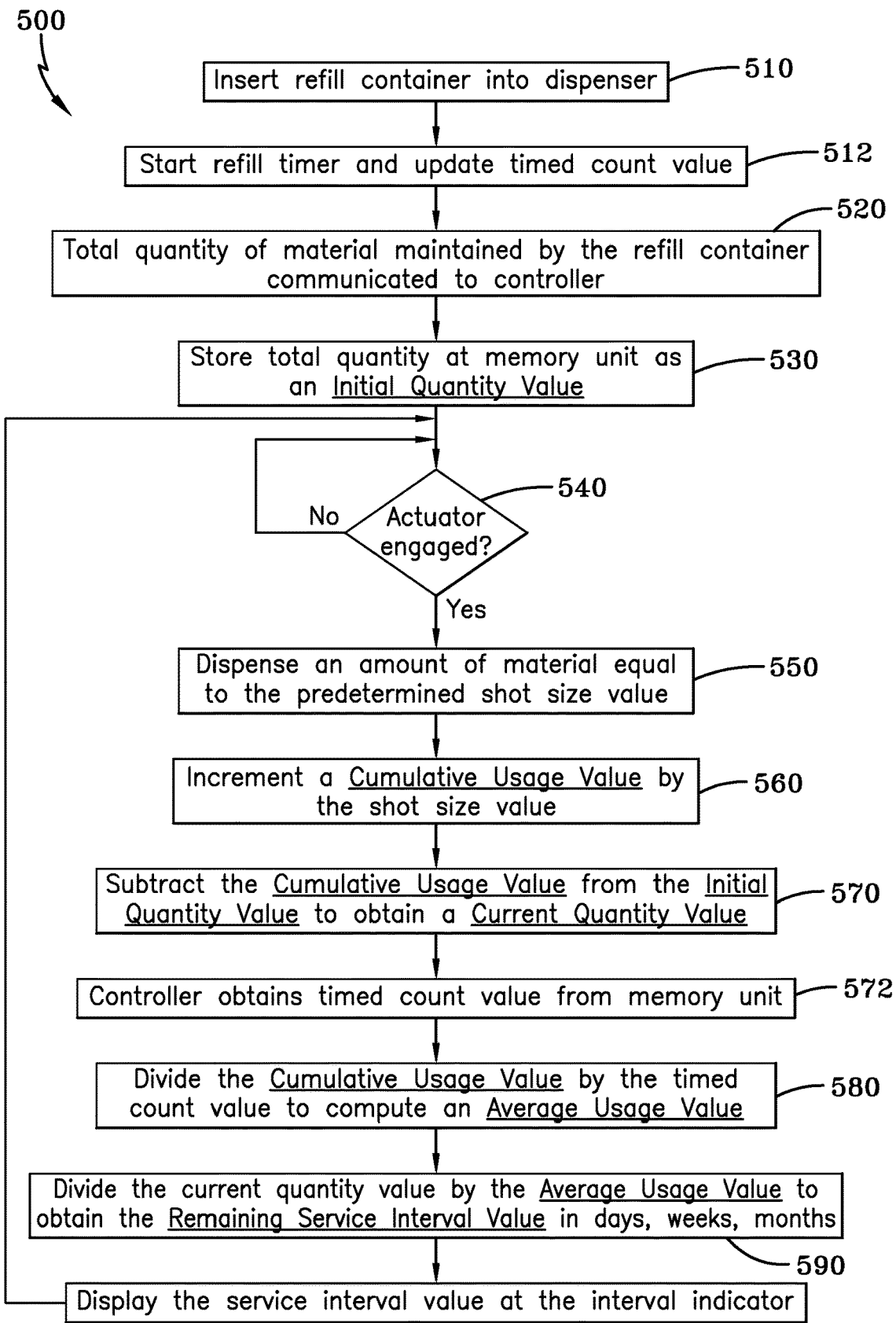
FIG. 7 is a flow diagram showing the operational steps taken by the dispenser when calculating a service interval value for display by the dispenser in accordance with the concepts of the present invention.

With the structural and functional aspects of the components of the dispenser 100 set forth, the following discussion will now present the operational steps, referred to by the numeral 500, as shown in FIG. 7, that are taken to calculate and display a service interval, which is referred to as the remaining service interval value. Initially at step 510, the refill container 110 is inserted into the dispenser 100 so as to be in operative communication with the pump 200. After the refill container 110 has been inserted, the timer 120 is reset and started, in order to update the timed count value maintained by the memory unit 300, as indicated at step 512. Somewhat simultaneously with step 512, the controller 150 communicates with the refill container 110 to identify the initial quantity value, which identifies the amount of material maintained in the refill container 110, as indicated at step 520. It should also be appreciated that in embodiments where the dispenser 100 does not communicate with the refill container 110 that the initial quantity value may be input manually via the keypad 454 or is pre-programmed into the dispenser 100 during manufacturing. Next, at step 530, the initial quantity value is stored at the memory unit 300 prior to moving to step 540, whereby the controller 150 determines whether the actuator 230 has been engaged. If the actuator 230 has not been engaged then the process 500 remains at step 540. However, when the actuator 230 is engaged, the process 500 continues to step 550, whereupon the dispenser 100 dispenses an amount of material equal to the predetermined shot size value that is stored at the memory unit 300.

Next, at step 560 the controller 150 increments a cumulative usage value by the predetermined shot size value. It should be appreciated that when the refill container 110 or cartridge is initially installed into the dispenser 110, the cumulative usage value is set to zero. After the cumulative usage value has been incremented, the controller 150 subtracts the cumulative usage value from the initial quantity value to obtain a current quantity value that is stored at the memory unit 300, as indicated at step 570. After the completion of step 570, the process 500 continues to step 572, where the controller 150 obtains the timed count or elapsed time value from the memory unit 300. Next, at step 580, the controller 150 computes an average usage value based on the cumulative usage value divided by the timed count value. The timed count value used to calculate the average usage value may be based on any time basis, such as days, weeks, months, etc. Once the average usage value has been computed, the process 500 continues to step 590, where the controller 150 divides the current quantity value by the average usage value to obtain the remaining service interval value. The computed service interval time or value is then displayed via the interval indicator 450 or 450', as indicated at step 600, and the process returns to the step of monitoring the actuator at 540 and continuing to index and update the various values through the process 500.

If a service person notes that the service interval time or value is less than the next scheduled visit, the refill cartridge or container 110 may then be replaced, or, alternatively, service personnel may then schedule a service visit for near the time indicated by the service interval indicator 450. In either event, replacement of the refill container 110 initiates and resets the various counters and registers such that the process 500 may begin anew.

Figure 8:
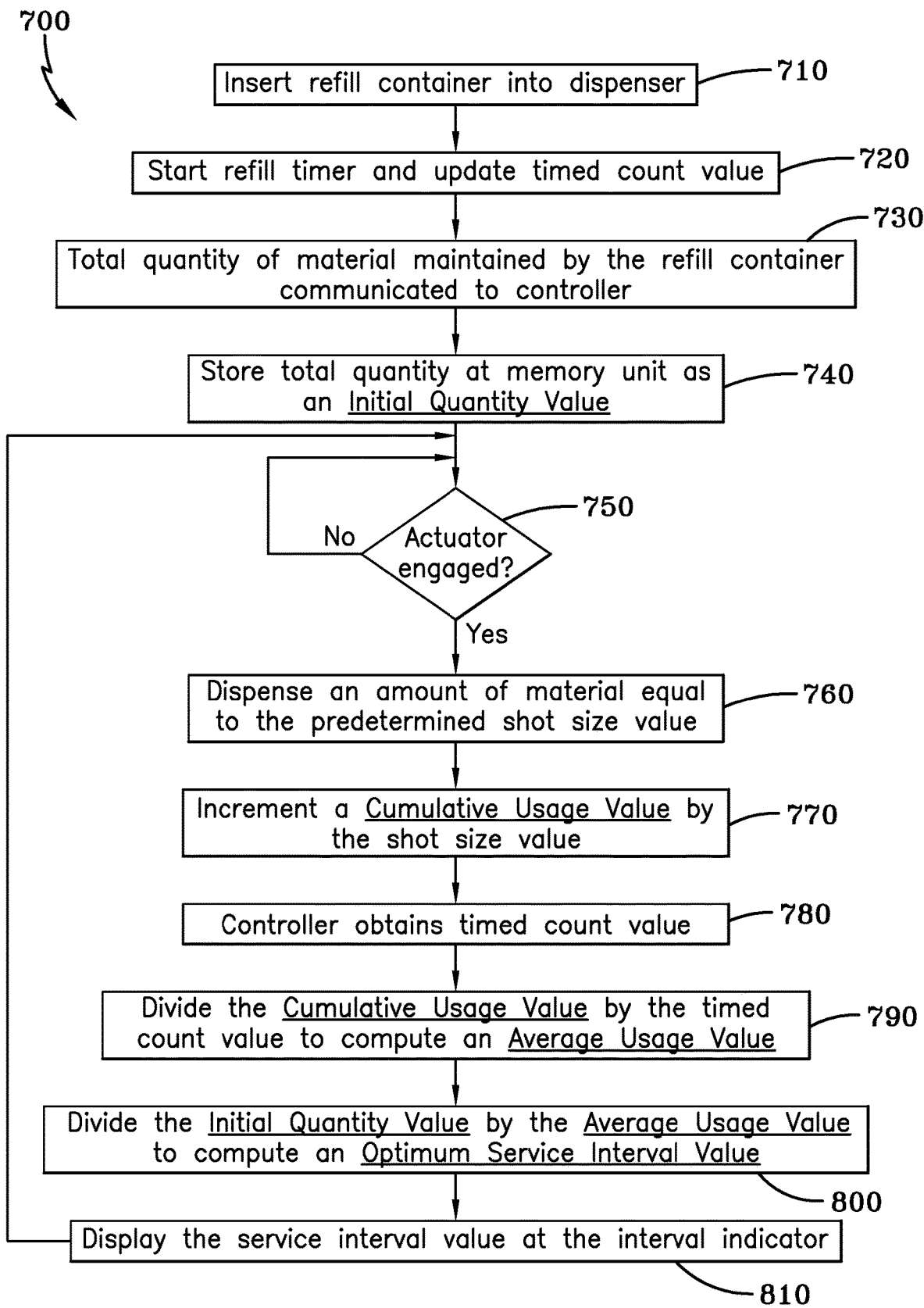
FIG. 8 is a flow diagram showing the operational steps taken by the dispenser when calculating an alternative service interval value for display by the dispenser in accordance with the concepts of the present invention.

In another embodiment, the dispenser 100 may be configured to calculate and display the optimum service interval, which represents the time in which the refill container 110 needs replacing based on its complete historical usage. As such, the operational steps taken by the dispenser 100 to compute the service interval are generally referred to by the numeral 700, as shown in FIG. 8 of the drawings. Initially at step 710, the refill container 110 is inserted into the dispenser 100 so as to be in operative communication with the pump 200. After the refill container 110 has been inserted, the timer 120 is reset and started in order to update the timed count value maintained by the memory unit 300, as indicated at step 720. Somewhat simultaneously with step 720, step 730 is performed, whereby the controller 150 communicates with the refill container 110 to identify the initial quantity value, which identifies the amount of material maintained in the refill container 110. It should also be appreciated that in embodiments where the dispenser 100 does not communicate with the refill container 110 that the initial quantity value may be input manually via the keypad 454 or is pre-programmed into the dispenser 100 during manufacturing. Next, at step 740, the initial quantity value is stored at the memory unit 300 prior to moving to step 750, whereby the controller 150 determines whether the actuator 230 has been engaged. If the actuator 230 has not been engaged, then the process 500 remains at step 750. However, when the actuator 230 is engaged, the process 700 continues to step 760, whereupon the dispenser 100 dispenses an amount of material equal to the predetermined shot size value that is stored at the memory unit 300.

Continuing to step 770, the controller 150 increments a cumulative usage value by the predetermined shot size value. It should be appreciated that when the refill container 110 or cartridge is initially installed into the dispenser 100, the cumulative usage value is set to zero. After the cumulative usage value has been incremented, the process 700 continues to step 780, where the controller 150 obtains the timed count value or elapsed time value from the memory unit 300. Next, at step 790, the controller 150 computes an average usage value based on the cumulative usage value divided by the timed count value. The timed count value used to calculate the average usage value may be based on any time basis, such as days, weeks, months, etc. Once the average usage value has been computed, the process 700 continues to step 800, where the controller 150 divides the initial quantity value by the average usage value to obtain the service interval value. The computed optimum service interval time or value is then displayed via the interval indicator 450 or 450', as indicated at step 810, before the process 700 returns to the step 540, where the process 700 resumes the monitoring of the actuator 230.

It will, therefore, be appreciated that one advantage of one or more embodiments of the present invention is that a dispenser maintains an integrated service interval indicator to reduce the amount of time an individual maintaining the dispenser needs to check the capacity of the refill container. Another advantage of the present invention is that a dispenser with an integrated service interval indicator utilizes a refill container that provides a refill memory unit, which communicates the initial quantity value to the dispenser. Yet another advantage of the present invention is that a dispenser with an integrated service interval indicator provides a keypad to enable a user to manually enter the initial quantity value associated with the refill container into the dispenser. An additional advantage of the present invention is that a dispenser with an integrated service interval indicator allows the individual responsible for replacing depleted refill containers to be made aware of the anticipated remaining operational life of the refill container without the need to physically open the dispenser to view the refill container, thus saving time and resources.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A dispenser to dispense material from a refill container, the dispenser comprising;
   a controller;
   a reader coupled to said controller, said reader adapted to communicate with the refill container, such that an initial quantity value associated with an amount of the material carried by the refill container is identified;
   an actuator coupled to said controller; and
   a pump coupled to said controller, said pump adapted to be operatively coupled to the refill container, wherein when said actuator is actuated, said pump dispenses a predetermined amount of the material from the refill container, whereupon a cumulative usage value is updated by said predetermined amount, and a current quantity value is determined from the difference between said initial quantity value and said cumulative usage value;

wherein a total time value is updated when said refill container is coupled to said pump, such that based on said total time value and said cumulative usage value and average usage value is determined, and wherein a service interval value is determined based on said current quantity value and said average usage value.

2. The dispenser of claim 1, wherein said reader comprises an RFID tag reader.

3. The dispenser of claim 1, wherein said actuator comprises a proximity sensor.

4. The dispenser of claim 1, wherein said service interval is determined by dividing said current quantity value by said average usage value.

5. A dispenser to dispense material from a refill container, the dispenser comprising:
a controller;
a reader coupled to said controller, said reader adapted to communicate with the refill container, such that an initial quantity value associated with an amount of the material carried by the refill container is identified;
an actuator coupled to said controller; and
a pump coupled to said controller, said pump adapted to be operatively coupled to the refill container, wherein when said actuator is actuated, said pump dispenses a predetermined amount of the material from the refill container, whereupon a cumulative usage value is updated by said predetermined amount;
wherein a total time value is updated when said refill container is coupled to said pump, such that based on said total time value and said cumulative usage value an average usage value is determined, and
wherein a service interval value is determined based on said initial quantity value and said average usage value.

6. The dispenser of claim 5, wherein said reader comprises an RFID tag reader.

7. The dispenser of claim 5, wherein said actuator comprises a proximity sensor.

8. The dispenser of claim 5, wherein said service interval is determined by dividing said initial quantity value by said average usage value.

9. A dispenser to dispense material from a refill container, the dispenser comprising;
a controller;
a reader coupled to said controller, said reader adapted to communicate with the refill container, such that an initial quantity value associated with an amount of the material carried by the refill container is identified;
an actuator coupled to said controller; and
a pump coupled to said controller, said pump adapted to be operatively coupled to the refill container, wherein when said actuator is actuated, said pump dispenses a predetermined amount of the material from the refill container, whereupon a cumulative usage value is updated by said predetermined amount, and a current quantity value is determined from the difference between said initial quantity value and said cumulative usage value;

wherein a total time value is updated when said refill container is coupled to said pump, such that based on said total time value and said cumulative usage value and average usage value is determined, and wherein a remaining service interval value is determined by dividing said current quantity value by said average usage value.

10. The dispenser of claim 9, wherein said actuator comprises a proximity sensor.

11. The dispenser of claim 9, wherein said refill container comprises an RFID tag and said reader comprises an RFID tag reader that reads said RFID tag.

12. The dispenser of claim 9, wherein said refill container comprises a bar code, and said reader comprises a bar code reader.

13. The dispenser of claim 9, wherein said refill container comprises a resistor representative of said initial quantity value.

14. The dispenser of claim 9, wherein said refill container comprises a potentiometer enabling manual entry of said initial quantity value.

15. The dispenser of claim 5, wherein said refill container comprises a bar code, and said reader comprises a bar code reader.

16. The dispenser of claim 5, wherein said refill container comprises a resistor representative of said initial quantity value.

17. The dispenser of claim 5, wherein said refill container comprises a potentiometer enabling manual entry of said initial quantity value.

18. The dispenser of claim 1, wherein said refill container comprises a bar code, and said reader comprises a bar code reader.

19. The dispenser of claim 1, wherein said refill container comprises a resistor representative of said initial quantity value.

20. The dispenser of claim 1, wherein said refill container comprises a potentiometer enabling manual entry of said initial quantity value.

* * * * *